United States Patent [19]

John

[11] Patent Number: 4,680,427
[45] Date of Patent: Jul. 14, 1987

[54] FIRE RESISTANT CAST CABLE CONNECTION

[75] Inventor: Gunther John, St. Paul, Minn.

[73] Assignee: Minnesota Mining and Manufacturing Company, St. Paul, Minn.

[21] Appl. No.: 765,680

[22] Filed: Aug. 15, 1985

[30] Foreign Application Priority Data

Aug. 31, 1984 [DE] Fed. Rep. of Germany ....... 3432158

[51] Int. Cl.⁴ .......................................... H02G 15/113
[52] U.S. Cl. ..................... 174/88 R; 174/76; 174/84 R; 174/92; 174/110 A; 174/110 S
[58] Field of Search ................ 174/84 R, 88 R, 92, 174/76, 121 A, 110 A, 110 S; 106/84

[56] References Cited

U.S. PATENT DOCUMENTS

| | | | |
|---|---|---|---|
| 2,421,652 | 6/1947 | Robinson et al. | 174/110 A |
| 3,273,225 | 9/1966 | Saums et al. | 174/121 A |
| 3,303,036 | 2/1967 | Coffin | 106/84 |
| 3,881,947 | 5/1975 | Palmer | 106/84 |
| 4,298,554 | 11/1981 | Vogel et al. | 106/84 X |
| 4,403,110 | 9/1983 | Morrisette | 174/84 R |
| 4,439,255 | 3/1984 | Imai et al. | 174/84 R |

FOREIGN PATENT DOCUMENTS

| | | | |
|---|---|---|---|
| 2044086 | 3/1972 | Fed. Rep. of Germany | 174/92 |
| 2047715 | 4/1972 | Fed. Rep. of Germany | 174/121 A |
| 131792 | 10/1979 | Japan | 174/121 A |
| 2059140 | 4/1981 | United Kingdom | 174/121 A |

Primary Examiner—Morris H. Nimmo
Attorney, Agent, or Firm—Donald M. Sell; James A. Smith; David K. Tellekson

[57] ABSTRACT

A cast cable connection comprising cables having their conductors interconnected and surrounding the conductors a housing containing a cured filler resin therein, said housing comprising bound, flexible, ceramic particles.

7 Claims, 2 Drawing Figures

FIRE RESISTANT CAST CABLE CONNECTION

TECHNICAL FIELD

This invention relates to a cast cable connection device for the preparation of electrical cable joints. More particularly, the invention relates to a cast or molded cable connection wherein the mold body is manufactured from inorganic ceramic materials, preferably in the form of fibers.

BACKGROUND ART

Cast cable connections have been known in the prior art. Such systems have the advantage that they can be easily fabricated in the field at the place of the cable connection. However, where an increased resistance to fire is required, such cable connections have, up to now, not been usable. For example, plastic mold bodies typically will melt when exposed to fire, such that the resinous filler typically contained within the mold body becomes exposed. Because of the required castability of such filler resins, they typically can be provided only with limited resistance to fire and will be destroyed relatively quickly. Accordingly, in areas where fire resistance is of extreme importance, cables that are used therein are provided with fire resistant covers thereover, without the use of cast cable connections. This requires an increased usage of special and expensive cables. If a placed cable is damaged, typically excessively long cable sections must be exchanged in their entirety. Accordingly, a large inventory of such expensive special cables must be maintained.

Plastic materials having increased fire resistance are known in the art in numerous versions. Only a few of these plastics, however, are suitable for use with electrical systems, and especially so relative to cast cable connections. With the exception of a few plastics which are self-extinguishing because of a high halogen content therein, typical plastics are flammable and will in fact support combustion. Examples of self-extinguishing plastics include polyvinylchloride and polytetrafluoroethylene. To eliminate this noted disadvantage relative to most plastics, fire retardant additives are typically included therewith. The most commonly used are halogen-containing, phosphorous-containing and antimony-containing combinations. When exposed to flame, the corresponding acids are released by such compositions, which can then thus prevent continued burning.

There is extensive patent literature discussing this concept, examples of which include DE-OS No. 15 69 123, wherein antimony chloride is taught to be capable of acting as a fire retarding additive, and also DE-OS No. 14 94 922, wherein phosphene and phosphoric acid combinations are suggested.

However, it is well known that the acids released as flame protecting or retarding agents can provide corrosive combinations such that electrical and electronic equipment, including cables, can be damaged or destroyed. Furthermore, it is known that flame-retarding plastics can develop a considerable quantity of smoke due to the effect of fire or flame thereon, which can prevent extinguishing and salvage operations. Also, it has been more recently determined that the combustion products from flame-resistant plastics are toxic.

These disadvantages are taught to be overcome in DE-OS No. 27 39 429 by including within the plastic an inorganic magnesium combination, an alkali chloride and an inorganic zinc or vanadium combination. In this case, not only are zinc and vanadium combinations expensive, but considerable concentration of alkali chloride is required to arrive at a desired level of flame retardency. Also, such materials are typically undesirable in electrical equipment. In DE-AS No. 17 69 312, the use of borate as a flame retarding additive is disclosed. Although borates do not generate acids, the flame retardation available through their use is relatively low, such that the additional use of other fire retardant additives, such as antimony oxide, becomes necessary.

Finally, as disclosed in DE-OS No. 28 09 294, a halogen-free flame retardant additive, namely aluminum hydroxide in combination with magnesium carbonate, can be utilized together with copolymers of polyolefins and synthetic rubber. However, when used in such plastic materials, the required quantities of such additives are rather high, and same can be uniformly combined only through equipment such as rubber mills.

Accordingly, cast cable connections having sufficiently high resistance to fire have been unavailable.

DISCLOSURE OF THE INVENTION

In accordance with the invention, there is provided a cast cable connection comprising a housing around said cable containing therewithin a resinous filler material, said housing comprising bound, flexible, ceramic particles.

In this manner, utilizing the invention, a cast cable connection can be provided with a housing having a flame resistance at least as good as halogen-containing plastic materials, and which does not release corrosive or toxic combustion products upon exposure to flame, while being capable of maintaining its integrity for a sufficient time frame to avoid exposure of the cable elements to flame.

DETAILED DESCRIPTION OF THE INVENTION

As discussed above, the cable connection defined by this invention has a high degree of resistance against open flame, thereby providing for retained integrity, even upon exposure to extremely elevated temperatures. Furthermore, because of the poor heat conductivity of the housing, same can minimize the amount of heat delivered to the cable and the resinous filler material contained within the housing thereby allowing for longer in-service for the cable connection. Because the housing consists of bound, flexible, ceramic particles, as opposed to an integral formed housing out of ceramic itself, same is lighter and not brittle, and thus not subject to breaking. The formed housing can thus be easily prepared and utilized in the field, virtually eliminating losses by breakage. Furthermore, because the bound flexible ceramic particles in effect provide a porous structure, there is excellent adhesion with the resinous material contained therein, such that the resinous material and housing provide in essence an integral unit wherein the resinous material in effect supports the housing, and thus the housing need not have elevated tensile strength.

Preferably, the ceramic particles are bound by a fire-resistant inorganic binder, the lack of an organic material thus optimizing the integrity of the housing upon exposure to elevated temperatures. Preferably, water glass is utilized as the fire-resistant inorganic binder. The use of water glass provides the advantage that one can provide the ceramic particles in the form of a water-stirrable powder, and after stirring, the formed mass will harden at normal room temperature. Other inorganic binders having similar properties can, of course, be also utilized.

Special advantages have been noted when the ceramic particles are fibrous in nature. The cast housing can be thus formed to provide an asbestos-like structure and be especially of lightweight. The fibrous structure, as thus noted above, provides for excellent adhesion of the polymeric filler resin contained within the cable connection. An example of a ceramic fiber material includes that marketed by the Morgan Company under the tradename of "Trition Kaowool", which can be simply mixed with water into a shapeable mass capable of hardening at ambient temperature.

In handling the cast cable connection, it is advantageous if the housing is manufactured out of several parts which are in essence connected and held together by the resinous material contained within the housing. Placement can be simply undertaken by applying the individual parts around previously connected conductors of the cable to be connected, and the space between the housing and the conductor connection is filled with a curable filler resin.

The curable resinous filler preferably contains at least one fire-retardant additive to increase the fire resistance thereof, and also will not form toxic or corrosive products upon exposure to flame. Plastic materials having these properties are known in the art and have previously been described. By including a fire-retarding additive, the resinous filler material itself becomes fire resistant so that upon exposure to flame the useable operating time of the cable connection is extended. Preferably, the resinous filler composition is halogen-free so that no corrosive halogen combinations will occur upon exposure to flame.

It is especially advantageous if the resinous filler contains an additive capable of releasing water upon exposure to flame. By this release of water and the evaporation thereof, a great deal of heat is absorbed such that the temperature of the resinous filler will be maintained below a critical limit for a rather long time frame. In this event, a degree of porosity of the housing is especially advantageous because the water vapor created can escape without cracking the housing by the increased pressure.

The water-releasing additive is preferably aluminum hydrate, a compound known to be used for this purpose and offering the advantage that a considerable quantity of heat is necessary in order to effect the release of the water as vapor.

Because the housing of the invention has extremely low thermal/conductivity, common resinous filler materials having relatively high heat conductivity can be utilized. This allows satisfactory dissipation of the heat generated by the electrical cable itself through the conductor connections within the cable connection.

It has been found that by utilizing the cable housing as per the invention, same can be fabricated with a temperature resistance in excess of 1200° C. Furthermore, because the housing is completely inorganic, exposure to flame provides no amount of smoke, gases, or vapors, such that no corrosive combustion products are formed, at least as long as the heat has not progressed to a point such that thermal decomposition of the resinous filler occurs.

Especially advantageous is the fact that the housing, as well as the combined cable connection can be made in a simple fashion with reduced costs. In this regard, the cable connection can be available in the form of a kit wherein the housing and a supply of filler resin, capable of being hardened or cured, are contained. The cable connection can be formed in simple fashion from the components included in the kit at the place of connecting the cables.

DESCRIPTION OF THE DRAWING

In the attached drawing,

More specifically, FIG. 1 illustrates a cast cable connection having a housing 1 fabricated from two shell-shaped parts 3 and 5 which are placed around a connection area of electrical cable 7 and 9. The housing has flange areas 11 and 13 which are placed on top of each other. In part 3, pouring hole 15 is provided for the insertion of the filler resin 17. Both parts 3 and 5 are formed preferably from ceramic fibers 23 utilizing water glass as a binder 25 (see FIG. 2), and together form a fire-resistant inorganic casting of low heat conductivity. During the fabrication of the cable connection, the filler resin 17 is applied through pouring hole 15 until the space between the ends of cables 7 and 9 and housing 1 is completely filled with curable resin 17. After the hardening of curing of the resinous mass, both parts 3 and 5 of the housing are bonded together and to the cable elements by cured resin mass 17.

FIG. 2 illustrates schematically that the irregularities and pores at inner surface 19 of housing 1. During the pouring of the filler resin 17, same will penetrate into these pores or irregularities. Also illustrated is a particle-shaped additive 21, which can be, for example, aluminum hydrate which is evenly distributed therethrough.

Figure 1:
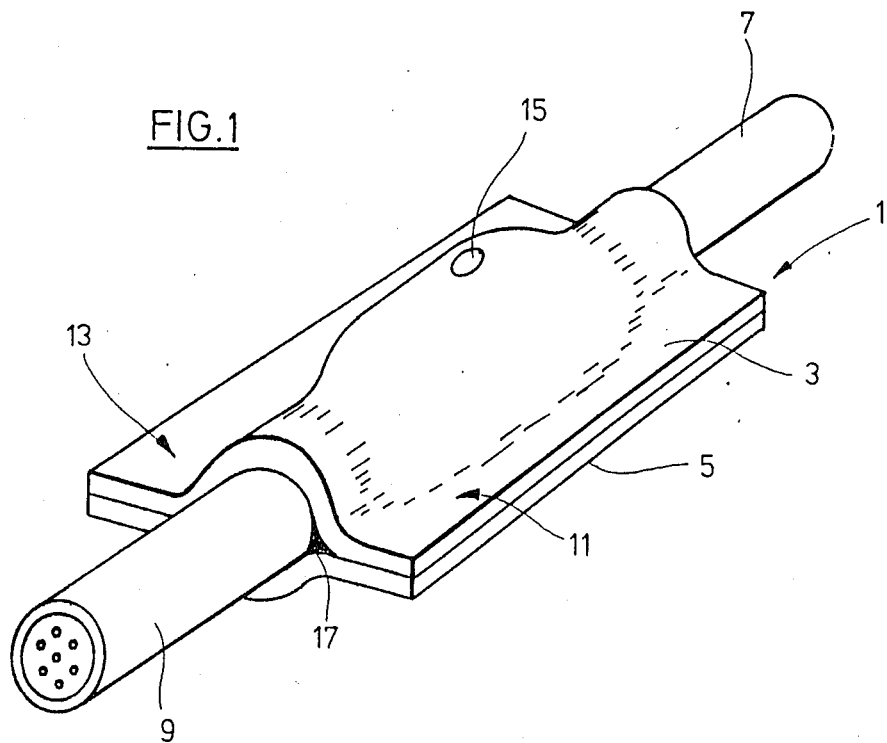
FIG. 1 illustrates a schematic prospective view of a cable connection as per the invention.
Figure 2:
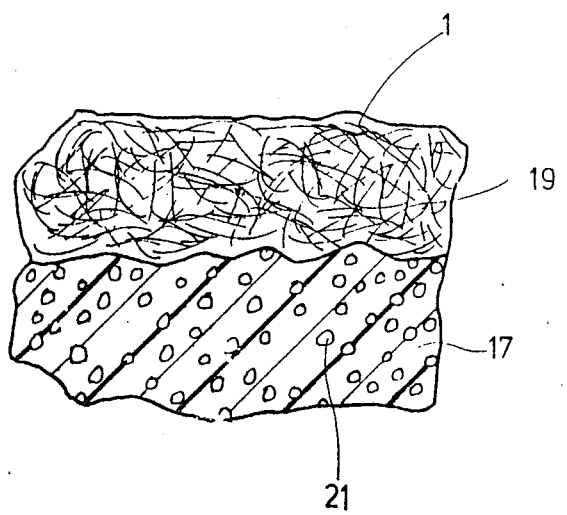
FIG. 2 illustrates a schematic enlarged cross-section of the transition area between the housing and the resinous filler material.

What is claimed is:

1. A cast cable connection comprising cables with their conductors interconnected, and surrounding said conductors, a housing containing a cured filler resin therein, said housing comprising flexible fiberous ceramic material bound together by a fire resistant inorganic binding agent, said housing being sufficiently porous to provide increased adhesion between said housing and said filler resin and to provide a substantially integral unit therebetween.

2. The cable connection of claim 1 wherein said binding agent is water glass.

3. The cable connection of claim 1 wherein said housing is comprised of more than one portion, the portions being bound together by said cured filler resin.

4. The cable connection of claim 1 wherein said cured filler resin contains at least one fire-retardant additive.

5. The cable connection of claim 4 wherein said cured filler resin is halogen-free.

6. The cable connection of claim 4 wherein said fire retardant additive is capable of releasing water at an elevated temperature.

7. The cable connection of claim 6 wherein said additive capable of releasing water is aluminum hydrate.

* * * * *